United States Patent [19]

Takahashi et al.

[11] Patent Number: 5,266,447
[45] Date of Patent: Nov. 30, 1993

[54] PHOTOCHROMIC COMPOSITION

[75] Inventors: Kazuhiro Takahashi; Yasukazu Nakada, both of Kawaguchi; Shigenobu Maruoka, Kawasaki; Ichiro Tsuchida, Koshigaya; Takanori Saito, Misato, all of Japan

[73] Assignee: Lintec Corporation, Tokyo, Japan

[21] Appl. No.: 658,072

[22] Filed: Feb. 20, 1991

[30] Foreign Application Priority Data

| Jul. 4, 1990 [JP] | Japan | 2-176950 |
| Jul. 4, 1990 [JP] | Japan | 2-176951 |
| Jul. 4, 1990 [JP] | Japan | 2-176952 |
| Jul. 9, 1990 [JP] | Japan | 2-181241 |

[51] Int. Cl.$^5$ ............................................. G03C 1/73
[52] U.S. Cl. ........................................ 430/345; 430/495; 430/962; 252/586
[58] Field of Search ............ 430/345, 19, 495, 962, 430/945, 346, 337, 332, 372; 252/586

[56] References Cited

U.S. PATENT DOCUMENTS

| 3,212,898 | 10/1966 | Cerreta | 430/345 |
| 3,322,542 | 5/1967 | Ullman et al. | 430/962 |
| 3,488,290 | 1/1970 | Gerhardt et al. | 252/600 |
| 3,844,792 | 10/1974 | Zweig et al. | 430/338 |
| 3,859,112 | 1/1975 | Kohmura et al. | 117/36.8 |
| 3,914,510 | 10/1975 | Glanz et al. | 430/644 |
| 3,941,598 | 3/1976 | Van Goethem et al. | 430/345 |
| 4,205,988 | 6/1980 | Ozaki et al. | 430/340 |
| 4,440,672 | 4/1984 | Chu | 252/586 |
| 4,769,308 | 9/1988 | Hiruma et al. | 430/272 |
| 5,017,698 | 5/1991 | Machida et al. | 544/71 |
| 5,219,822 | 6/1993 | Neumann | 503/227 |

FOREIGN PATENT DOCUMENTS

| 0195898 | 10/1985 | European Pat. Off. . |
| 0350009 | 1/1990 | European Pat. Off. . |

OTHER PUBLICATIONS

Japanese Patent Laid-Open Publication No. 58-113203(A), Jul. 1983, English Abstract only.
Patent Abstract of Japan, vol. 13, No. 302, Jul. 1989, English Abstract of JP 1-90285 (A).
Patent Abstract of Japan, vol. 14, No. 189, Apr. 1990, English Abstract of JP 2-35442 (A).
Patent Abstract of Japan, vol. 12, No. 5, Jan. 1988, English Abstract of JP 62-164685 (A).

*Primary Examiner*—Charles L. Bowers, Jr.
*Assistant Examiner*—John A. McPherson
*Attorney, Agent, or Firm*—Webb, Burden, Ziesenheim & Webb

[57] ABSTRACT

Disclosed is a photochromic composition comprising an organic photochromic compound and a specific tertiary amine compound which are dissolved or dispersed in a high-molecular compound. Also disclosed are a photochromic film composed of the above photochromic composition and a photochromic laminate having a photochromic layer composed of the above photochromic composition on a surface of a substrate.

8 Claims, No Drawings

PHOTOCHROMIC COMPOSITION

FIELD OF THE INVENTION

The present invention relates to a photochromic composition, more particularly to a photochromic material which is excellent in light-resistance and can be reversibly colored and discolored repeatedly for a long period of time.

BACKGROUND OF THE INVENTION

Photochromism means such characteristics of a material that the material develops a color under irradiation with excitation rays such as ultraviolet rays and returns to the initial uncolored state when allowing the material to stand or the material is irradiated with infrared or visible rays or heated after the ultraviolet rays irradiation. That is, photochromism means that the material is reversibly colored and discolored repeatedly.

Photochromic compounds have the above-mentioned characteristics, and the color density of the compounds in the coloration and the discoloration differs depending on the intensity of the irradiated excitation rays and the time of irradiation, so that they have been widely used for various materials such as window glasses in architectures and sunglasses, utilizing their photochromic characteristics. Further, photochromic materials using such photochromic compounds have been tried to apply to image-forming materials for copying, recording or the like.

The photochromic compounds used for the photochromic materials are broadly classified into organic photochromic compounds and inorganic photochromic compounds.

Most of the inorganic photochromic compounds are solid and in the form of grains. Further, the specific gravity of the inorganic photochromic compounds is larger than that of organic high-molecular compounds, so that it is difficult to dissolve or homogeneously disperse the inorganic photochromic compounds in the organic high-molecular compounds. On the other hand, the organic photochromic compounds can be homogeneously mixed with the organic high-molecular compounds, so that they can produce photochromic films having uniformity in the coloration and the discoloration, and also produce photochromic laminates in which a photochromic layer having uniformity in the coloration and the discoloration is laminated on a substrate.

However, some problems still resides in the organic photochromic compounds. For example, if the organic photochromic compound is irradiated with excitation rays for a long period of time, the compound is sometimes oxidized to suffer deterioration. Further, if the organic photochromic compound is oxidized, the compound loses the photochromic characteristics of the reversible coloration and discoloration.

Therefore, various methods have been proposed to improve the photochromic composition containing the organic photochromic compound. In concrete, for restraining the deterioration of the organic photochromic compound, there have been proposed a method of adding hydroxybenzophenone, hydroxybenzotriazole or derivatives thereof to the composition as described in U.S. Pat. No. 3,212,898, a method of adding a hindered amine compound thereto as described in U.S. Pat. No. 3,488,290, and a method of adding a nickel complex thereto as described in Japanese Patent Laid-open Publication No. 58(1983)-173181. Also proposed are a method of adding a thioether compound to the composition as described in Japanese Patent Laid-open Publication No. 58(1983)-113203 and a method of adding a hindered phenol compound or a phosphite compound thereto as described in U.S. Pat. No. 3,488,290.

However, ultraviolet absorbing agents such as hydroxybenzophenone and hydroxybenzotriazole absorb ultraviolet rays required for exciting the organic photochromic compound to develop a color, and thereby the light sensitivity of the photochromic composition lowers, or the deterioration of the organic photochromic compound caused by application of light is accelerated depending on the kind of the organic photochromic compound or the ultraviolet absorbing agent used.

A hindered amine light stabilizer (HALS) is known to have plural functions such as a function as a singlet oxygen quencher, a function as a radical-trapping agent and a function as a hydroperoxide decomposing agent. However, a photochromic composition containing the hindered amine light stabilizer and the organic photochromic compound is insufficient in the light-resistance, and hence the photochromic composition is required to be much more improved in the light-resistance in the case where the resulting photochromic material is expected to be used repeatedly.

A photochromic composition containing the nickel complex and the organic photochromic compound is also insufficient in the light-resistance, and additionally, the photochromic composition is colored owing to the nickel complex even when the light irradiation is not conducted.

Further, in the case where a hindered phenol compound, a phosphite compound or a thioether compound is used instead of the hindered amine light stabilizer or the nickel complex, the resulting photochromic composition is also insufficient in the light-resistance.

SUMMARY OF THE INVENTION

The present invention is to solve the above-mentioned problems existing in the prior arts, and it is an object of the invention is to provide photochromic compositions which are hardly decreased in the light sensitivity and are excellent in light-resistance.

A first photochromic composition provided by the invention is a photochromic composition comprising an organic photochromic compound and a tertiary amine compound having the formula (I):

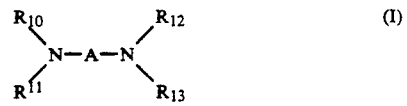

wherein $R_{10}$ to $R_{13}$ may be the same or different, each of them represents an alkyl group having 1-4 carbon atoms or an epoxylalkenyl group having 4 or less carbon atoms and may be substituted by a substituting group containing N, S or O; and A may contain N, S or O in the midway and represents an unsubstituted or substituted alkylene group, an unsubstituted or substituted phenylene group, or an unsubstituted or substituted heterocyclic ring containing N, S or O; wherein the organic photochromic compound and the tertiary amine compound are dissolved or dispersed in a high-molecular compound.

A second photochromic composition provided by the invention is a photochromic composition comprising an organic photochromic compound and a tertiary amine compound having the formula (II):

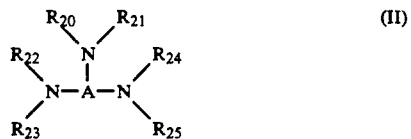

wherein $R_{20}$ to $R_{25}$ may be the same or different, each of them represents an alkyl group having 1–4 carbon atoms and may be substituted by a substituting group containing N, S, O; and A is unsubstituted or substituted cycloalkane bonded to a nitrogen atom directly or by way of an alkylene group which may contain N, O or

or an unsubstituted or substituted heterocyclic ring containing N, S, O or P bonded to a nitrogen atom directly or by way of an alkylene group which may contain N, O or

wherein the organic photochromic compound and the tertiary amine compound are dissolved or dispersed in a high-molecular compound.

A third photochromic composition provided by the invention is a photochromic composition comprising an organic photochromic compound and a tertiary amine compound having the formula (III):

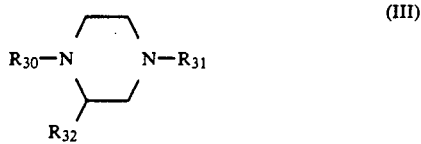

wherein $R_{30}$ and $R_{31}$ independently represent an alkyl group having 1–4 carbon atoms which may be substituted by a substituting group containing N, S or O, or may form an alkylene chain in combination with each other; and $R_{32}$ represents a hydrogen atom or a methyl group; wherein the organic photochromic compound and the tertiary amine compound are dissolved or dispersed in a high-molecular compound.

A fourth photochromic composition provided by the invention is a photochromic composition comprising an organic photochromic compound and a tertiary amine compound having the formula (IV):

wherein $R_{40}$ and $R_{41}$ may be the same or different, and each of them represents an alkyl group having 1–20 carbon atoms which may be substituted by a substituting group containing N, S or O, an unsubstituted or substituted cycloalkyl group bonded to a nitrogen atom directly or by way of an alkylene group, an unsubstituted or substituted phenyl group, or an unsubstituted or substituted heterocyclic ring containing N, S or O; and $R_{42}$ represents an alkyl group having 1–4 carbon atoms and may be substituted by a substituting group containing N, S or O; wherein the organic photochromic compound and the tertiary amine compound are dissolved or dispersed in a high-molecular compound.

The present invention also provides a photochromic film which is composed of any one of the above-mentioned photochromic compositions and a photochromic laminate which has a photochromic layer composed of any one of the above-mentioned photochromic compositions on a surface of a substrate.

DETAILED DESCRIPTION OF THE INVENTION

First of all, the photochromic compositions according to the present invention will be described in detail.

In the photochromic compositions of the invention, an organic photochromic compound (1) and a specific tertiary amine compound (2) are dissolved or dispersed in a high-molecular compound.

As the organic photochromic compound, there can be preferably employed spiro compounds having the formula (v):

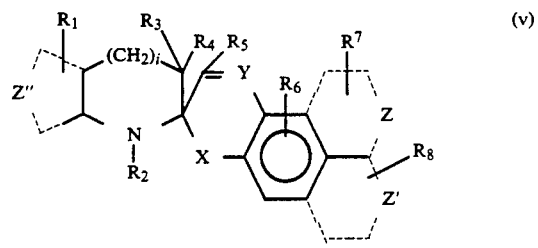

In the formula (V), i is an integer of 0 or 1; X is -O- or -S-; Y is one element selected from =CH—, =CR$_9$ and =N—; and each of Z, Z' and Z" may be present or may not be present, and if present, each of them is a saturated ring or an unsaturated ring which may contain a hetero atom. Examples of the above-mentioned saturated rings include a cyclohexyl ring and a cyclopentyl ring. Examples of the above-mentioned unsaturated rings include a benzene ring and a heterocyclic ring containing N, S or O.

$R_1$, $R_6$, $R_7$ and $R_8$ in the formula (V) may be the same or different, and each of them is one element selected from a hydrogen atom, a halogen atom, a nitro group, an unsubstituted or substituted amino group, a hydroxyl group, an oxycarbonyl group, a carboxyl group, a sulfonic acid group, a carbamoyl group, a carboxyamide group, a sulfamoyl group, a sulfonamide group, a sulfanyl group, a sulfonyl group, a cyano group, an unsubstituted or substituted alkyl group, an unsubstituted or substituted aryl group, an alkoxy group, an aryloxy group, and an acyl group.

$R_2$ to $R_5$ and $R_9$ in the formula (V) may be the same or different, and each of them is a hydrogen atom, an unsubstituted or substituted alkyl group having 1–18 carbon atoms, an aralkyl group having 7–18 carbon atoms, or a cycloalkyl group having 4–10 carbon atoms.

Examples of the substituting groups in each of $R_1$ to $R_9$ of the formula (V) include a halogen atom, an alkoxy group having 1–20 carbon atoms, an amino group, a nitro group, a monoalkylamino or dialkylamino group having 1-36 carbon atoms, a hydroxyl group, a carboxyl group, an oxycarboxyl group having 20 or less carbon atoms, an acyl group having 20 or less carbon atoms, an oxycarbonyl group having 20 or less carbon atoms, a carbamoyl group having 20 or less carbon atoms, and a sulfamoyl group having 20 or less carbon atoms.

The spiro compounds can be remarkably improved in the light-resistance when used in combination with the specific tertiary amine compounds (described later).

As examples of the spiro compounds, there can be mentioned the following spiroxazine compounds, spiropyran compounds and thiopyran compound.

[Spiroxazine compound]

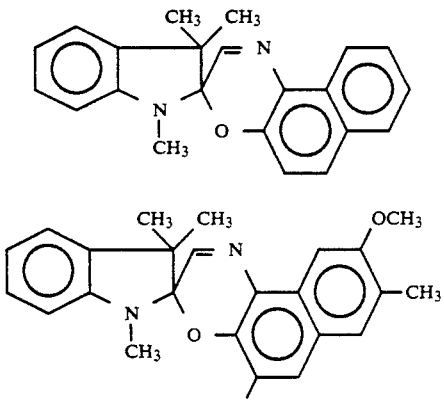

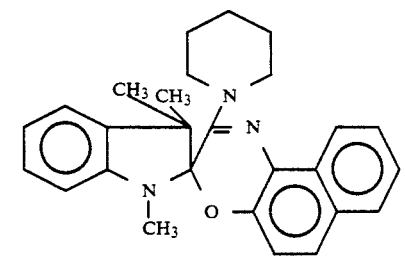

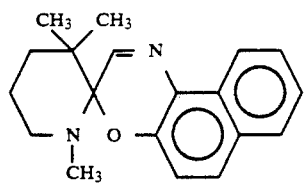

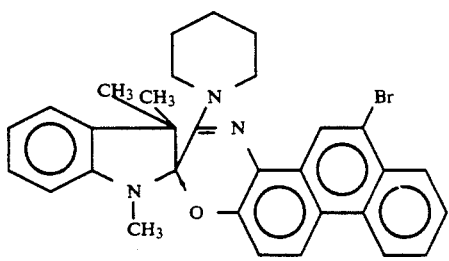

[Spiropyran compound]

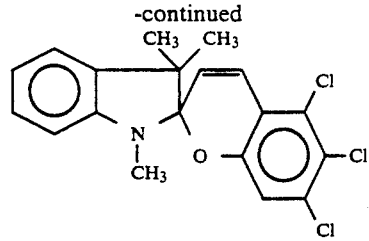

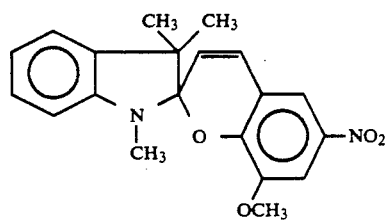

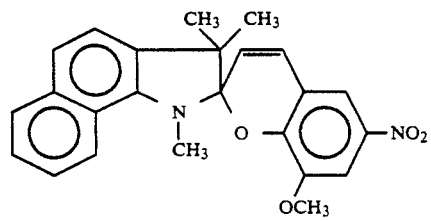

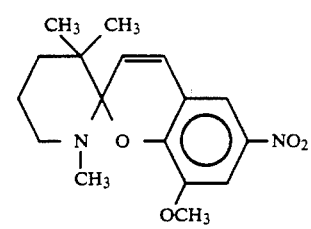

[Thiopyran compound]

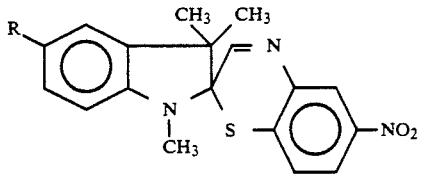

In the above formula, concrete examples of R include —OCH$_3$, —CH$_3$, —H, —Cl and —NO$_2$.

In the first photochromic composition according to the invention, the specific tertiary amine compound used in combination with the photochromic compound has the following formula (I):

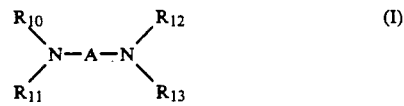

In the formula (I), $R_{10}$ to $R_{13}$ may be the same or different, and each of them represents an alkyl group having 1-4 carbon atoms or an epoxyalkenyl group having 4 or less carbon atoms and may be substituted by a substituting group containing N, S or O. Concrete examples thereof include a methyl group, an ethyl group, a propyl group, a butyl group and a 2-hydroxyethyl group.

A in the formula (I) may contain N, S or O in the midway, and represents an alkylene group, a phenylene group or a heterocyclic ring containing N, S or O. Each of those groups and the ring may be substituted by, for example, an alkyl group (e.g., a methyl group and an ethyl group), an alkoxy group (e.g., a methoxy group and an ethoxy group), and a halogen atom (e.g., Cl and Br).

Examples of the bonding group A are as follows.

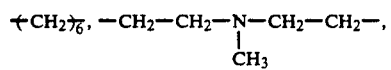
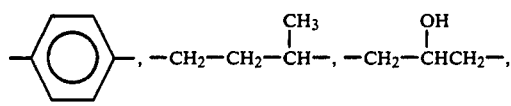
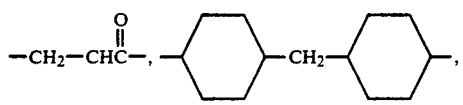
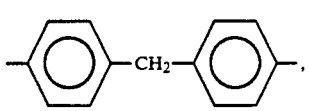

Examples of the tertiary amine compounds having the formula (I) are described below.

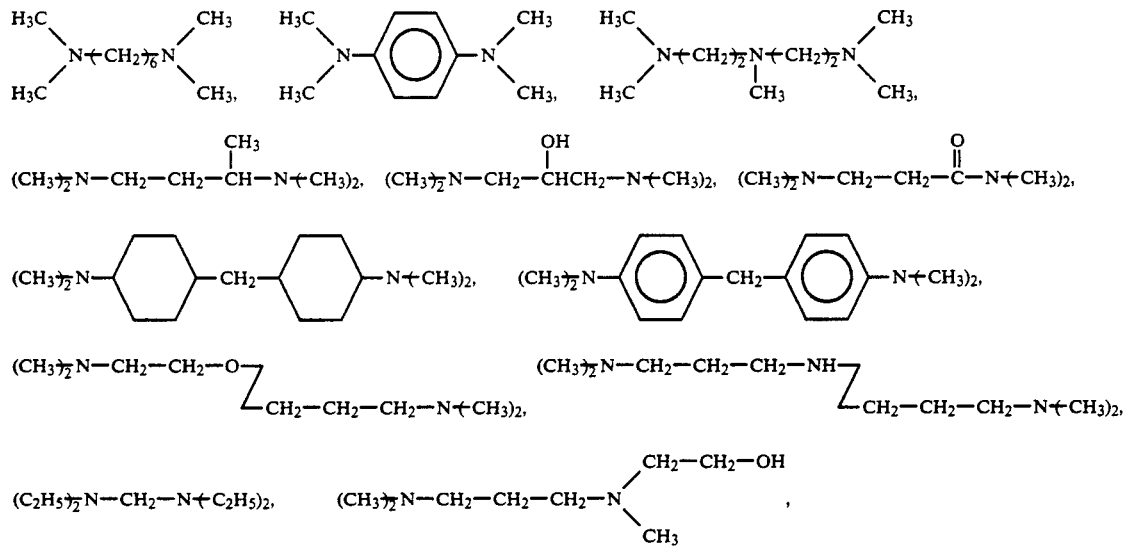

In the second photochromic composition according to the invention, the specific tertiary amine compound used in combination with the organic photochromic compound has the following formula (II):

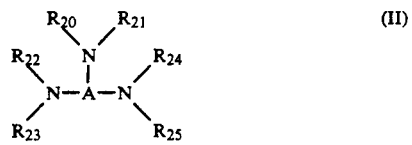

In the formula (11), $R_{20}$ to $R_{25}$ may be the same or different, and each of them represents an alkyl group having 1–4 carbon atoms and may be substituted by a substituting group containing N, S or O.

A in the formula (II) is a cycloalkane bonded to a nitrogen atom directly or by way of an alkylene group which may contain N, O or

or a heterocyclic ring containing N, S, O or P. The cycloalkane or the heterocyclic ring may be substituted by a substituting group. Concrete examples of the cycloalkane and the heterocyclic ring are as follows.

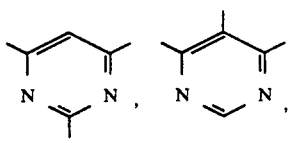

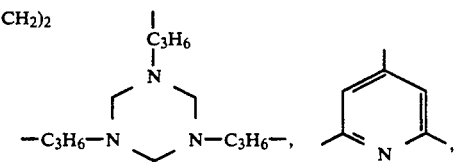

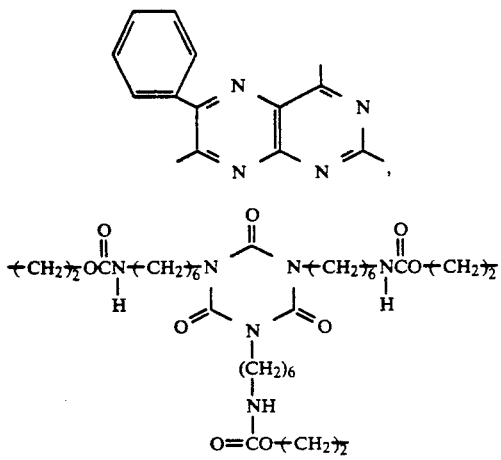

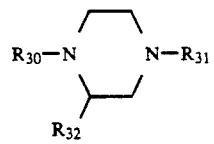

Examples of the tertiary amine compounds having the formula (II) are described below.

In the formula (III), $R_{30}$ and $R_{31}$ may be the same or different, and each of them represents an alkyl group having 1–4 carbon atoms and may be substituted by a substituting group containing N, S or O. Concrete examples of $R_{30}$ or $R_{31}$ include a methyl group, an ethyl group, a propyl group, a diethylaminoethyl group and a hydroxyethyl group. $R_{30}$ and $R_{31}$ may form an alkylene chain (for example an ethylene chain) in combination with each other.

$R_{32}$ in the formula (III) is a hydrogen atom or a methyl group.

Examples of the tertiary amine compounds having the formula (III) are described below.

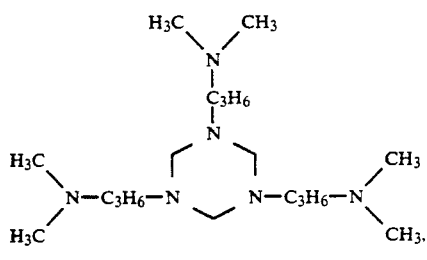

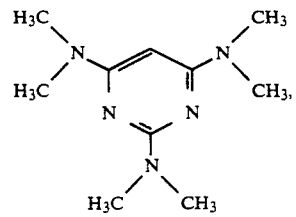

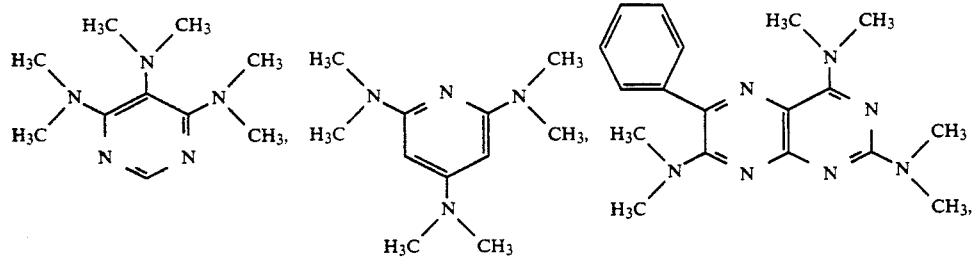

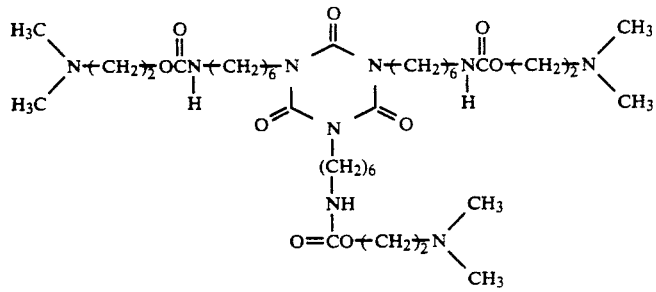

In the third photochromic composition according to the invention, the specific tertiary amine compound used in the combination with the organic photochromic compound has the formula (III):

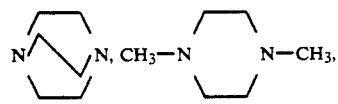

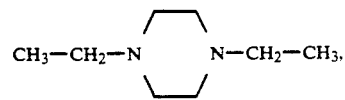

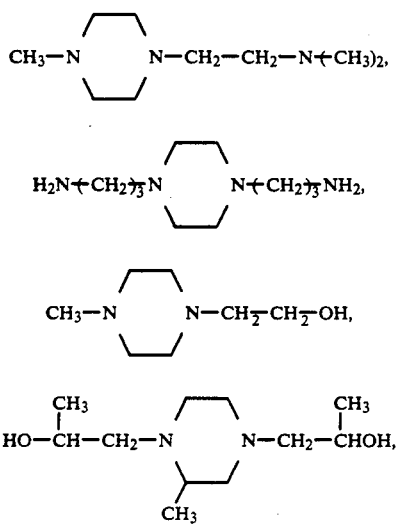

In the fourth photochromic composition according to the invention, the specific tertiary amine compound used in combination with the organic photochromic compound has the formula (IV):

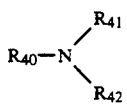

(IV)

In the formula (IV), $R_{40}$ and $R_{41}$ may be the same or different, and each of them represents an alkyl group having 1-20 carbon atoms which may be substituted by a substituting group containing N, S or O, a cycloalkyl group bonded to a nitrogen atom directly or by way of an alkylene group, a phenyl group, or a heterocyclic ring containing N, S or O. Concrete examples of $R_{40}$ or $R_{41}$ include an octyl group, a 2-hydroxyethyl group, a cyclohexyl group, a phenyl group, a benzyl group and a pyridyl group. Those groups such as a phenyl group and a benzyl group may be substituted by, for example, an alkyl group (e.g., a methyl group or an ethyl group), an alkoxy group (e.g., a methoxy group or an ethoxy group) or a halogen atom (e.g., Cl or Br).

$R_{42}$ in the formula (IV) is an alkyl group having 1-4 carbon atoms and may be substituted by a substituting group containing N, S or O. Examples of $R_{42}$ include a methyl group, an ethyl group, a propyl group, a butyl group and a 2-hydroxyethyl group.

Examples of the tertiary amine compounds having the formula (Iv) are as follows.
N, N-dimethylaniline
N, N-dimethylbenzylamine
N, N-dimethyldodecylamine
N, N-dicyclohexylmethylamine
triethylamine
triethanolamine
dibutylaminopropylamine The high-molecular compound (3) plays a role as a binder. The high-molecular compound preferably has a good affinity for both the aforementioned organic photochromic compounds and the above-mentioned tertiary amine compounds, and preferably is optically transparent. Examples of the high-molecular compounds include polymethylmethacrylate, polyvinyl acetate, polyvinyl butyral and polyvinyl alcohol.

In the photochromic compositions of the invention, the organic photochromic compound (1) is generally used in an amount of 0.01 to 25 parts by weight, preferably 0.5 to 2 parts by weight, per 100 parts by weight of the high-molecular compound (3).

In the photochromic compositions of the invention, the tertiary amine compound (2) is generally used in an amount of 0.001 to 100 parts by weight, preferably 3 to 30 parts by weight, per 100 parts by weight of the high-molecular compound (3).

To the photochromic compositions of the invention may be added a cross-linking agent such as an isocyanate compound, an epoxy compound, an amine compound, an ethyleneimine compound or a metal chelate compound in an appropriate amount, depending on the kind of the used high-molecular compound (3).

Further, a plasticizer can be also added in an appropriate amount to the photochromic compositions of the invention, depending on the kind of the used high-molecular compound (3).

Examples of the plasticizers employable in the invention include phosphate derivatives such as trioctyl phosphate and triphenyl phosphate, adipate derivatives such as didecyl adipate and dibutyl adipate, sebacate derivatives such as dibutyl sebacate and dioctyl sebacate, azelate derivatives such as dioctyl azelate and dihexyl azelate, citrate ester derivatives such as triethyl citrate and tributyl citrate, glycol ester derivatives such as methyl phthalyl ethyl glycolate and butyl phthalyl butyl glycolate, trimellitate derivatives such as trioctyl trimellitate, phthalate derivatives such as dioctyl phthalate, ricinoleate derivatives such as methyl acetyl ricinoleate and butyl acetyl ricinoleate, polyester derivatives such as polypropylene adipate and polypropylene sebacate, epoxy derivatives such as epoxy butyl stearate and epoxy octyl stearate, and glycol derivatives such as polyethylene glycol and polypropylene glycol.

The photochromic compositions according to the invention can be prepared, for example, by the following process, and further the obtained photochromic composition can be processed, for example, in the following manner to produce a photochromic material of a desired form.

1. The high-molecular compound (3) is dissolved in an appropriate solvent. To the resulting solution are added the organic photochromic compound (1), the tertiary amine compound (2) and, if necessary, a cross-linking agent and a plasticizer, and they are mixed to prepare a mixture (A) containing a photochromic composition of the invention. The obtained mixture is applied to a surface of a substrate by a coating method such as cast coating or roll coating, and the layer thus obtained is dried Thus, a photochromic material in the form of a laminate in which a photochromic layer is laminated on a surface of the substrate is produced.

2. The mixture (A) obtained in the above-mentioned stage 1 is sprayed and dried by a spray drying method or the like. Thus, a photochromic material in the form of a powder is produced.

3. The mixture (A) obtained in the stage 1 is dropped in a solvent which has no or poor solubility for the high-molecular compound under stirring, to precipitate the mixture (A). The obtained precipitate is then collected and dried. Thus, a photochromic material in the form of grains is produced 4. From the mixture (A) obtained in the stage 1 is removed the solvent to obtain a photochromic composition composed of plural components. The obtained photochromic composition is melted and kneaded, and thus treated photochromic composition is then subjected to injection molding or extrusion molding. Thus, a photochromic material in the form of a film or in a desired form is produced.

Examples of the solvents employable for preparing the mixture in the stage 1 include water; alcohols such as methanol and ethanol; ketones such as acetone, methyl ethyl ketone and methyl butyl ketone; aromatic solvents such as benzene, toluene and xylene; ethers such as diethyl ether and tetrahydrofuran; esters such as methyl acetate and ethyl acetate; and mixtures of two or more of these solvents.

EFFECTS OF THE INVENTION

In the photochromic compositions of the invention, the organic photochromic compound and the specific tertiary amine compound are used in combination, so that the light-resistance of the organic photochromic compound can be improved, and further the light sensitivity required for the coloration can be hardly decreased. Accordingly, photochromic compositions much more improved in both the light sensitivity and the light-resistance can be provided by the present invention.

The photochromic compositions of the invention are further described by the following examples, but the examples are by no means given to restrict the invention.

EXAMPLE 1

In 23.3 g of a mixture solvent of toluene and 2-propanol (toluene: 2-propanol = 1:1) was dissolved 0.1 g of spiroindolinophenanthrooxazine having a peak absorption at 366 nm, and in the resulting solution was further dissolved 9.8 g of polyvinyl butyral (trade name: Denka Butyral #2000-L, available from Denki Kagaku Kogyo K.K.). Then, to the resulting solution was added 0.1 g of N,N,N',N'-tetramethyl-1,6-diaminohexane (tertiary amine compound) and the mixture was stirred, to prepare 33.4 g of a solution.

The solution was applied on a polyethylene terephthalate base film having a thickness of 38 μm using a doctor blade, and the layer thus formed was dried at 80° C. for 3 minutes to form a photochromic layer having a thickness of 25 μm on the base film. Thus, a photochromic laminate was obtained.

The photochromic laminate thus obtained was colorless and transparent in the normal state, but developed a uniform color of blue violet when irradiating ultraviolet rays. Thus colored photochromic laminate returned to the initial colorless and transparent state by irradiation with infrared or visible rays or by heating.

The above-mentioned spiroindolinophenanthrooxazine is ring-opened under irradiation with ultraviolet rays to form a merocyanine structure, so as to develop a color. In this stage, if the compound deteriorates too much, the compound cannot return to the initial spiroindolinophenanthrooxazine structure even when the irradiation with the ultraviolet rays is terminated.

Therefore, the obtained photochromic laminate was evaluated on the light-resistance in the following manner.

The colorless and transparent photochromic laminate in the initial state was measured on the absorbance $A_0$ at 366 nm (maximum absorption wavelength of spiroindolinophenanthrooxazine) by the use of a ultraviolet rays-infrared or visible rays automatic spectrophotometer (MPS-2000, produced by Shimazu Seisakusho Co.).

The photochromic laminate was then continuously irradiated with ultraviolet rays for the period of 50 hours and 100 hours using a carbon arc lamp equipped in a fade meter (CF-20S, produced by the same company). Thereafter, the photochromic laminate was heated to 80° C. to make the laminate completely colorless and transparent. This colorless and transparent photochromic laminate was measured on the absorbance $A_t$ at 366 nm in the same manner as described above.

The values $A_0$ and $A_t$ obtained as above were introduced into the following equation, to evaluate the light-resistance of the photochromic laminate.

Light-resistance (%) = $(A_t/A_0) \times 100$

In the evaluation on the light-resistance, the larger the value obtained by the above equation becomes, the higher the light-resistance of the laminate becomes.

The results are set forth in Table 1.

EXAMPLE 2

The procedures of Example 1 were repeated except for using N,N,N',N'-tetramethyl-p-phenylenediamine as the tertiary amine compound, to produce a photochromic laminate. The obtained photochromic laminate was evaluated on the light-resistance in the same manner as described in Example 1.

The results are set forth in Table 1.

EXAMPLE 3

The procedures of Example 1 were repeated except for using N,N,N',N'',N''-pentamethyl-diethylenetriamine as the tertiary amine compound, to produce a photochromic laminate. The obtained photochromic laminate was evaluated on the light-resistance in the same manner as described in Example 1.

The results are set forth in Table 1.

EXAMPLE 4

The procedures of Example 1 were repeated except for using 1,3,5-tris(3-dimethylaminopropyl)hexahydros-triazine as the tertiary amine compound, to produce a photochromic laminate. The obtained photochromic laminate was evaluated on the light-resistance in the same manner as described in Example 1.

The results are set forth in Table 1.

EXAMPLE 5

The procedures of Example 1 were repeated except for using 1,4-diazabicyclo[2,2,2]octane as the tertiary amine compound, to produce a photochromic laminate. The obtained photochromic laminate was evaluated on the light-resistance in the same manner as described in Example 1.

The results are set forth in Table 1.

EXAMPLE 6

The procedures of Example 1 were repeated except for using N,N'-dimethylpiperazine as the tertiary amine compound, to produce a photochromic laminate. The obtained photochromic laminate was evaluated on the light-resistance in the same manner as described in Example 1.

The results are set forth in Table 1.

EXAMPLE 7

The procedures of Example 1 were repeated except for using N,N-dimethylaniline as the tertiary amine compound, to produce a photochromic laminate. The obtained photochromic laminate was evaluated on the light-resistance in the same manner as described in Example 1.

The results are set forth in Table 1.

EXAMPLE 8

The procedures of Example 1 were repeated except for using N,N-dimethylbenzylamine as the tertiary amine compound, to produce a photochromic laminate. The obtained photochromic laminate was evaluated on the light-resistance in the same manner as described in Example 1.

The results are set forth in Table 1.

COMPARATIVE EXAMPLE 1

The procedures of Example 1 were repeated except for not using any tertiary amine compound, to produce a photochromic laminate. The obtained photochromic laminate was evaluated on the light-resistance in the same manner as described in Example 1.

The results are set forth in Table 1.

COMPARATIVE EXAMPLES 2–6

The procedures of Example 1 were repeated except for using a hindered phenol type antioxidant (trade name: Irganox 1010, available from Ciba-Geigy), a phosphite type antioxidant (trade name: Mark 135A, available from Adeca Argus Chemical Co. Ltd.), a thioether type antioxidant (trade name: AO-503A, available from Adeca Argus Chemical Co. Ltd.), a nickel metal complex type light stabilizer (trade name: Cyasorb UV1084, available from American Cyanamid Co.), and a hindered amine type light stabilizer (trade name: Sanol LS-770, available from Sankyo Co., Ltd.), respectively, as the tertiary amine compound, to produce photochromic laminates of Comparison Examples 2 to 6.

Subsequently, each of the photochromic laminates of Comparison Examples 2 to 6 was measured on the absorbance $A_t$ in the same manner as described in Example 1, and they were evaluated on the light-resistance in the same manner as described in Example 1.

The results are set forth in Table 1.

TABLE 1

| | | Light-resistance | |
|---|---|---|---|
| | Additives | 50 hours | 100 hours |
| Example 1 | N,N,N',N'-tetramethyl-1,6-diaminohexane | 90 | 82 |
| Example 2 | N,N,N',N'-tetramethyl-p-phenylenediamine | 90 | 80 |
| Example 3 | N,N,N',N'',N''-pentamethyl-diethylenetriamine | 91 | 84 |
| Example 4 | 1,3,5-tris(3-dimethylamino-propyl)hexahydro-s-triazine | 87 | 82 |
| Example 5 | 1,4-diazabicyclo[2,2,2]octane | 87 | 75 |
| Example 6 | N.N'-dimethylpiperazine | 87 | 75 |
| Example 7 | N,N-dimethylaniline | 85 | 69 |
| Example 8 | N,N-dimethylbenzylamine | 86 | 70 |
| Comp. Ex. 1 | none | 57 | 24 |
| Comp. Ex. 2 | hindered phenol (Irganox 1010) | 64 | 38 |
| Comp. Ex. 3 | phosphite (Mark 135A) | 41 | 21 |
| Comp. Ex. 4 | thioether (Mark AO-503A) | 54 | 29 |
| Comp. Ex. 5* | Ni complex | 80 | 65 |
| Comp. Ex. 6 | (Cyasorb UV1084) hindered amine (Sanol LS-770) | 73 | 45 |

The laminate indicated by the mark "*" was green owing to the nickel complex even before the laminate was irradiated with ultraviolet rays.

As is evident from the results set forth in Table 1, all of the photochromic laminates obtained in Comparison Examples 1 to 6 are lower than the photochromic laminates obtained in Examples 1 to 8 in both the light sensitivity for coloration and the light-resistance.

Further, it has been confirmed that the photochromic compositions of the present invention are more excellent in both the light sensitivity for coloration and the light-resistance as compared with the conventional photochromic compositions improved in the light-resistance, because the photochromic laminates obtained in Examples 1 to 8 and Comparison Examples 1 to 6 have the same structure except for their photochromic compositions.

What is claimed is:

1. A photochromic composition comprising a high-molecular compound; an organic photochromic compound and a tertiary amine compound having the formula (I):

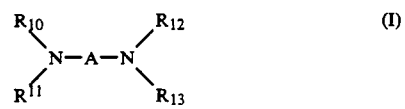

wherein $R_{10}$ to $R_{13}$ may be the same or different, and each of them represents an alkyl group having 1–4 carbon atoms or an epoxyalkenyl group having 4 or less carbon atoms and may be substituted by a substituting group containing N, S or O; and A may contain N or O in the midway and represents an unsubstituted or substituted alkylene group, an unsubstituted or substituted phenylene group, or an unsubstituted or substituted heterocyclic ring containing N, S or O; and said organic photochromic compound is a photochromic spiro compound represented by the following formula (V):

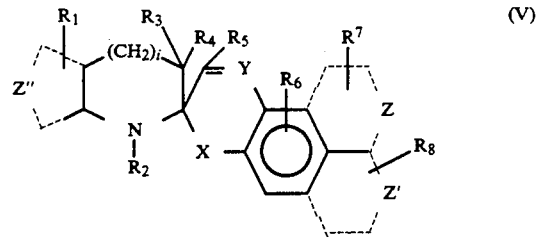

wherein i is an integer of 0 or 1; X is —O— or —S—; Y is one element selected from =CH—, =CR$_9$ and =N—; and each of Z, Z' and Z" may be present or may not be present, and if present, each of them is a saturated ring or an unsaturated ring which may contain a hetero atom; $R_1$, $R_6$, $R_7$ and $R_8$ may be same or different, and each of them is one element selected from a hydrogen atom, a halogen atom, a nitro group, an unsubstituted or substituted amino group, a hydroxyl group, an oxycarbonyl group, a carboxyl group, a sulfonic acid group, a carbamoyl group, a carboxyamide group, a sulfamoyl group, a sulfonamide group, a sulfanyl group, a sulfonyl group, a cyano group, an unsubstituted or substituted alkyl group, an unsubstituted or substituted aryl group, an alkoxy group, an aryloxy group and an acyl group, and $R_0$ to $R_5$ and $R_9$ group may be same or different, and each of them is a hydrogen atom, an unsubstituted or substituted alkyl group having 1-18 carbon atoms, an aralkyl group having 7-18 carbon atoms or a cycloalkyl group having 4-10 carbon atoms;

wherein said organic photochromic compound and said tertiary amine compound are dissolved or dispersed in the high-molecular compound.

2. A photochromic composition comprising an organic photochromic compound and a tertiary amine compound having the formula (II):

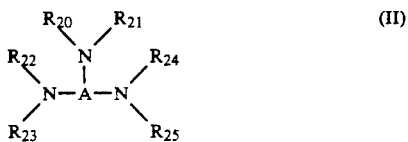

wherein $R_{20}$ to $R_{25}$ may be the same or different, and each of them represents an alkyl group having 1-4 carbon atoms and may be substituted by a substituting group containing N, S or O; and A represents unsubstituted or substituted cycloalkane bonded to a nitrogen atom directly or by way of an alkylene group which may contain N, O or

or an unsubstituted or substituted heterocyclic ring containing N, S, O or P bonded to a nitrogen atom directly or by way of an alkylene group which may contain N, O or

and said organic photochromic compound is a photochromic spiro compound represented by the following formula (V):

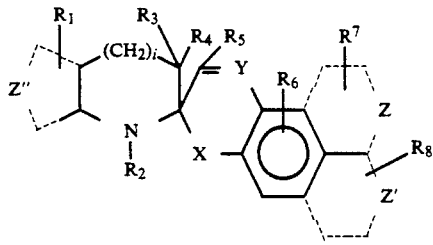

wherein i is an integer of 0 or 1; X is —O— or —S—; Y is one element selected from =CH—, =CR$_9$ and =N—; and each of Z, Z' and Z" may be present or may not be present, and if present, each of them is a saturated ring or an unsaturated ring which may contain a hetero atom; $R_1$, $R_6$, $R_7$ and $R_8$ may be same or different, and each of them is one element selected from a hydrogen atom, a halogen atom, a nitro group, an unsubstituted or substituted amino group, a hydroxyl group, an oxycarbonyl group, a carboxyl group, a sulfonic acid group, a carbamoyl group, a carboxyamide group, a sulfamoyl group, a sulfonamide group, a sulfanyl group, a sulfonyl group, a cyano group, an unsubstituted or substituted alkyl group, an unsubstituted or substituted aryl group, an alkoxy group, an aryloxy group and an acyl group, and $R_2$ to $R_5$ and $R_9$ group may be same or different, and each of them is a hydrogen atom, an unsubstituted or substituted alkyl group having 1-18 carbon atoms, an aralkyl group having 7-18 carbon atoms or a cycloalkyl group having 4-10 carbon atoms;

wherein said organic photochromic compound and said tertiary amine compound are dissolved or dispersed in a high-molecular compound.

3. The photochromic composition as claimed in claim 1 wherein the amount of said organic photochromic compound is 0.01 to 25 parts by weight per 100 parts by weight of the high molecular compound and the amount of said tertiary amine compound is 0.001 to 100 parts by weight per 100 parts by weight of the high molecular compound.

4. The photochromic composition as claimed in claim 2 wherein the amount of said organic photochromic compound is 0.01 to 25 parts by weight per 100 parts by weight of the high molecular compound and the amount of said tertiary amine compound is 0.001 to 100 parts by weight per 100 parts by weight of the high molecular compound.

5. A photochromic film which is composed of the photochromic composition as claimed in claim 1.

6. A photochromic film which is composed of the photochromic composition as claimed in claim 2.

7. A photochromic laminate which has a photochromic layer composed of the photochromic composition as claimed in claim 1.

8. A photochromic laminate which has a photochromic layer composed of the photochromic composition as claimed in claim 2.

* * * * *

UNITED STATES PATENT AND TRADEMARK OFFICE
CERTIFICATE OF CORRECTION

PATENT NO. : 5,266,447
DATED : November 30, 1993
INVENTOR(S) : Kazuhiro Takahashi, Yasukazu Nakada, Shigenobu Maruoka, Ichiro Tsuchida and Takanori Saito It is certified that error appears in the above-indentified patent and that said Letters Patent is hereby corrected as shown below:

Column 8 Line 8 "(11)" should read --(II)--.

Column 11 Line 55 (Iv)" should read --(IV)--.

Column 12 Line 56 after "dried" insert --.--.

Column 12 Line 68 after "produced" insert --.--.

Column 14 Line 19 "($A_t/A_0$)" should read -- $\{A_t/A_0\}$ --.

Claim 1 Line 25 Column 16 "comprising" should read
   --consisting essentially of--.

Signed and Sealed this

Twenty-fourth Day of May, 1994

Attest:

BRUCE LEHMAN

Attesting Officer      Commissioner of Patents and Trademarks